US007637339B2

(12) United States Patent
Suzuki

(10) Patent No.: US 7,637,339 B2

(45) Date of Patent: Dec. 29, 2009

(54) NUMBER PLATE FOR A STRADDLE TYPE VEHICLE

(75) Inventor: Takayuki Suzuki, Iwata (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 348 days.

(21) Appl. No.: 11/391,714

(22) Filed: Mar. 28, 2006

(65) Prior Publication Data

US 2006/0260858 A1 Nov. 23, 2006

(30) Foreign Application Priority Data

Mar. 28, 2005 (JP) ............................ 2005-091290

(51) Int. Cl.
*B62K 11/00* (2006.01)

(52) U.S. Cl. ........................................ 180/219; 40/590

(58) Field of Classification Search ................. 180/219; 40/590

See application file for complete search history.

(56) References Cited

U.S. PATENT DOCUMENTS 4,077,145 A * 3/1978 Smoczynski ................. 40/590
D279,799 S * 7/1985 Kupperman et al. ......... D20/13
4,609,202 A * 9/1986 Miyakoshi et al. .......... 280/276
4,763,538 A * 8/1988 Fujita et al. ...................... 74/6

FOREIGN PATENT DOCUMENTS

JP 08-099665 * 4/1996
JP 08099665 * 4/1996

* cited by examiner

*Primary Examiner*—Paul N Dickson
*Assistant Examiner*—Michael R Stabley
(74) *Attorney, Agent, or Firm*—Knobbe, Martens, Olsen & Bear, LLP

(57) ABSTRACT

A number plate is provided comprising a body having an indicating portion and an elongated band extending from the number plate body. The band has a wrapping portion to be wrapped around a handlebar of a straddle type vehicle. An engagement portion is formed on a base of the elongated band to engage with a control cable. Engaging the control cable in the engagement portion in this manner can increase the mounting rigidity of the number plate.

20 Claims, 8 Drawing Sheets

12
14
20
10
22
23
21
11

NUMBER PLATE FOR A STRADDLE TYPE VEHICLE

CROSS-REFERENCE TO RELATED APPLICATIONS

This application is based on and claims priority under 35 U.S.C. § 119(a)-(d) to Japanese Patent Application No. 2005-091290, filed Mar. 28, 2005, the entire contents of which is hereby incorporated by reference.

BACKGROUND OF THE INVENTION

1. Field of the Invention

The present invention generally relates to a number plate and, more particularly, to a number plate that can be attached to a handlebar of a straddle type vehicle.

2. Description of the Related Art

Often when a straddle type vehicle is used in racing competition, a front plate indicating a number is attached to the vehicle body. The front plate usually is secured to the vehicle by an upper bracket with screws or the like. However, when the vehicle is used over rugged terrain, the front plate often swings, which makes it hard to see the numbers and/or letter disposed on the front plate.

Prior art front plates, such as the one shown in FIGS. 1 and 2, attempt to resolve this problem. As shown in FIG. 1, a front number plate 100 has a body portion 101 and a band portion 102 at an upper part of the body 101. The band portion 102 is wrapped around a portion of a handlebar 103 to limit the swinging and/or twisting of the front number plate 100. The band portion 102 of the front number plate 100 as described above is typically made of plastic resin or the like, and thus is flexible so as to conform to the position and shape of any particular handlebar. The flexibility, however, also can result in movement of the number plate when a straddle type vehicle operates over rugged terrain. In addition, the band portion 102 may move around due to wind pressure, impacts that the vehicle receives during operation, or the like.

When the handlebar is a straight handlebar having a tension bar, a bar pad, which is wrapped around the tension bar, supports the band portion. As a result, the band portion is fairly rigidly attached to the vehicle. When the vehicle features a tapered handlebar, however, as shown in FIG. 2, a space 110 is created between the handlebar 103 and the band portion 102. The space 110 can result in reduced mounting rigidity for the band portion 102.

In some off-road straddle type vehicles (e.g., two-wheeled motor vehicles equipped with a two-stroke engine), when the engine speed is reduced, the rider typically increases the engine speed while the transmission is in a half clutch state and then engages the clutch. Because such an operating technique puts a heavy load on the clutch, the rider frequently adjusts the play in the clutch. Thus, as shown in FIG. 1, some off-road two-wheeled motor vehicles have a clutch quick adjuster 106 located between a clutch lever 104 and a clutch cable 105 so that the rider can easily adjust the clutch play while operating the vehicle. The clutch quick adjuster 106 is designed to adjust the play in the clutch as a ring portion is turned, and is operable by the rider with one hand during operation of the vehicle.

As described above, when the handlebar is a tapered handlebar, the band portion 102 often is not tightly connected to the handlebar. Therefore, when the vehicle is used over rugged terrain, the band portion 102 might twist or otherwise deform. In such situations, the band portion 102 can get in the way of the rider's operation of the clutch quick adjuster 106.

This is particularly problematic when the rider attempts to operate the clutch quick adjuster 106 with the right hand since the band portion 102 might somewhat obstruct access to the clutch quick adjuster 106, such as by covering the clutch quick adjuster 106.

SUMMARY OF THE INVENTION

Embodiments of the present invention have been made in view of the foregoing problem, and it is an object of the present invention to provide a number plate for a straddle type vehicle with a relatively simple structure that facilitates operability of a clutch assembly. In one embodiment, the present invention provides a number plate for a straddle type vehicle that more securely mounts the number plate relative to a clutch quick adjuster disposed on a handlebar of the vehicle.

One aspect of the present invention involves a number plate for a straddle type vehicle. The number plate comprises a body. The body comprises a lower portion, a central portion, and an upper portion. An elongated band comprises a lower portion and an upper portion. The upper portion of the elongated band extends at least partially upward from the upper portion of the body. The elongated band comprises a wrapping portion adapted to at least partially wrap around a handlebar of the vehicle. The wrapping portion of the band is held in place at least partially by the handlebar. An engagement portion is formed. on the lower portion of the elongated band. The engagement portion is adapted to engage a clutch cable extending from a clutch lever of the vehicle. As a result, the number plate is at least partially held in place by the clutch cable.

An aspect of the present invention also involves a straddle type vehicle comprising a frame. The frame is supported by a wheel. The wheel rotates about a generally horizontal axis. An engine is supported by the frame. A steering shaft comprises at least a portion of the frame. A handlebar is coupled to the steering shaft and is adapted to rotate the steering shaft so as to steer the vehicle. A clutch assembly is at least partially coupled to the handlebar. The clutch assembly comprises a clutch lever and a clutch cable extending from the clutch lever. A number plate comprises a body portion and an elongated band. The band extends from the body portion of the number plate. The band comprises a wrapping portion adapted to at least partially wrap around the handlebar. An engagement portion is formed on a lower portion of the elongated band. The engagement portion is adapted to engage with the clutch cable. Accordingly, the number plate is at least partially held in place by the clutch cable.

In an additional aspect of the present invention, a front number plate for an off-road two-wheeled motor vehicle is provided. The front number plate comprises an indicating portion adapted to display at least one number. The front number plate also comprises a band portion extending from an upper part of the body portion of the number plate. The band portion comprises a base portion and an elongated band. The base portion is connected to the upper part of the body portion of the number plate. In addition, the base portion defines an engagement portion and a retaining portion. The engagement portion is configured so as to receive at least a portion of a control cable on a handlebar of the vehicle. The engagement portion maintains such at least a portion of a control cable substantially attached to the front number plate. The elongated band is adapted to at least partially wrap around at least a portion of the handlebar. The retaining portion of the base portion of the band can receive at least a portion of the elongated band. The retaining portion also maintains such at least a portion of the elongated band substantially attached to the base portion of the band so as to securely maintain the front number plate on the handlebar during operation of the vehicle.

BRIEF DESCRIPTION OF THE DRAWINGS

These and other features, aspects, and advantages of the present invention will now be described in connection with a preferred embodiment of the invention shown in the accompanying drawings. The illustrated embodiment, however, is merely an example and is not intended to limit the invention. The drawings include eight figures.

FIG. 5(*b*) is a cross-sectional view of the number plate of FIG. 3 taken along line IIb-IIb of FIG. 3.

FIG. 8(*b*) is an enlarged vertical sectional view of the number plate of FIG. 8(*a*) taken along line VIb-VIb of FIG. 8(*a*).

DETAILED DESCRIPTION OF THE PREFERRED EMBODIMENT

Figure 1:
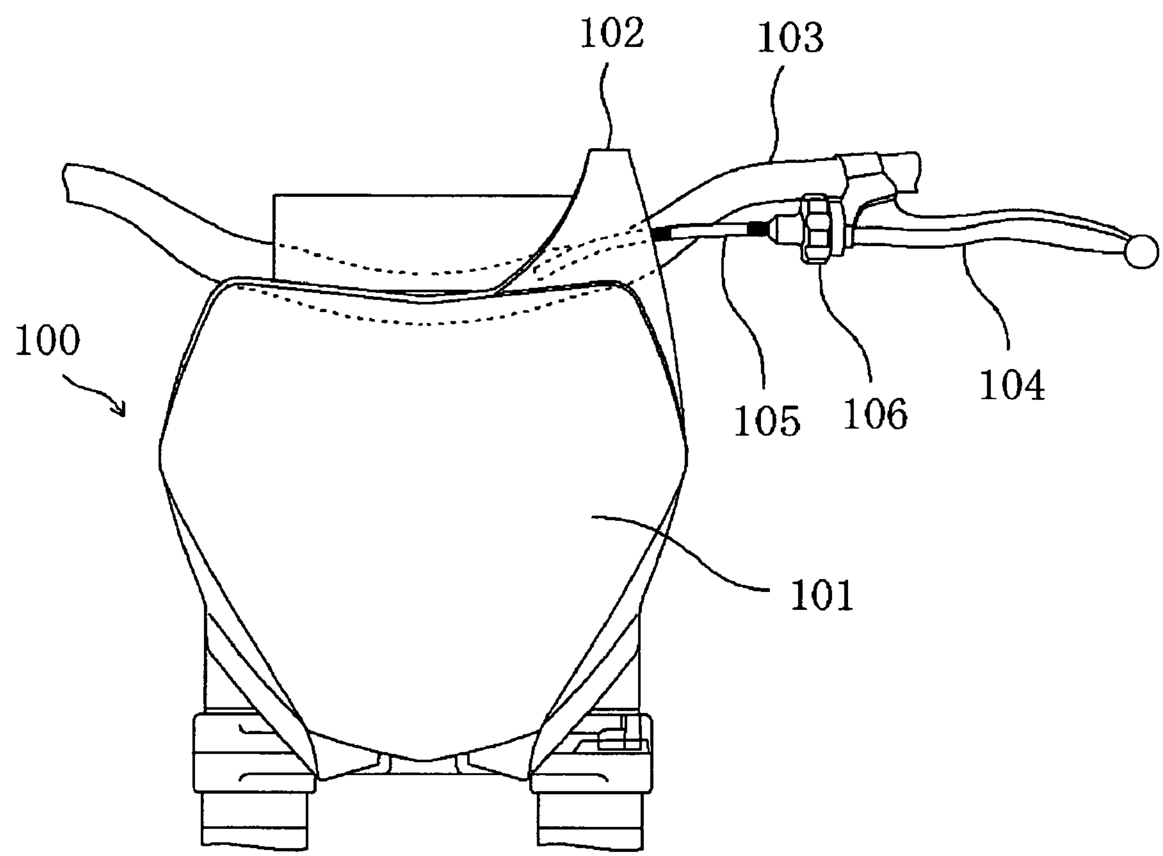
FIG. 1 is a front elevational view of a prior art front number plate having a band portion that is attached to the handlebar of a straddle type vehicle.
Figure 2:
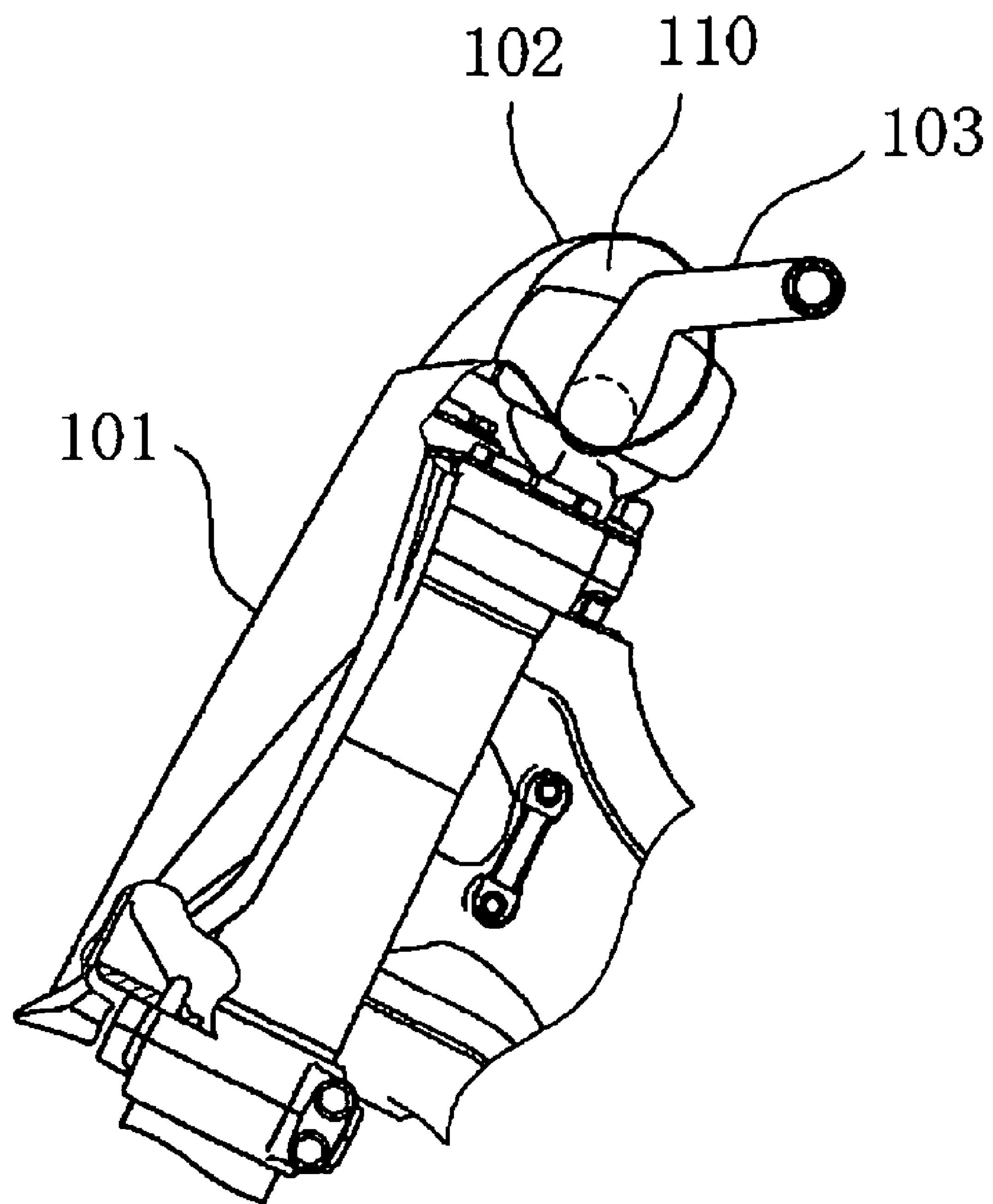
FIG. 2 is a side elevational view of the prior art front number plate of FIG. 1.

A number plate is illustrated in the drawings and is described below in the context of a straddle type vehicle. However, the number plate can be used with other types of vehicles. Preferably, the number plate can be used with vehicles having a wheel that rotates about a generally horizontal axis, a steering column, a steering mechanism coupled to the top of the steering column (e.g., a handlebar), and a straddle type seat located substantially near the steering column. For example, such vehicles in which the number plate described herein can be employed include, but are not limited to, a motorcycle, a motorized scooter, a multi-terrain vehicle, a two-wheeled motor vehicle, a three-wheeled motor vehicle, a four-wheeled motor vehicle, and a motor vehicle having more than four wheels. Accordingly, the following description and the drawings describe a number plate as used in connection with a two-wheeled motor vehicle; however, the present number plate can be used on other types of straddle type vehicles as well.

Figure 3:
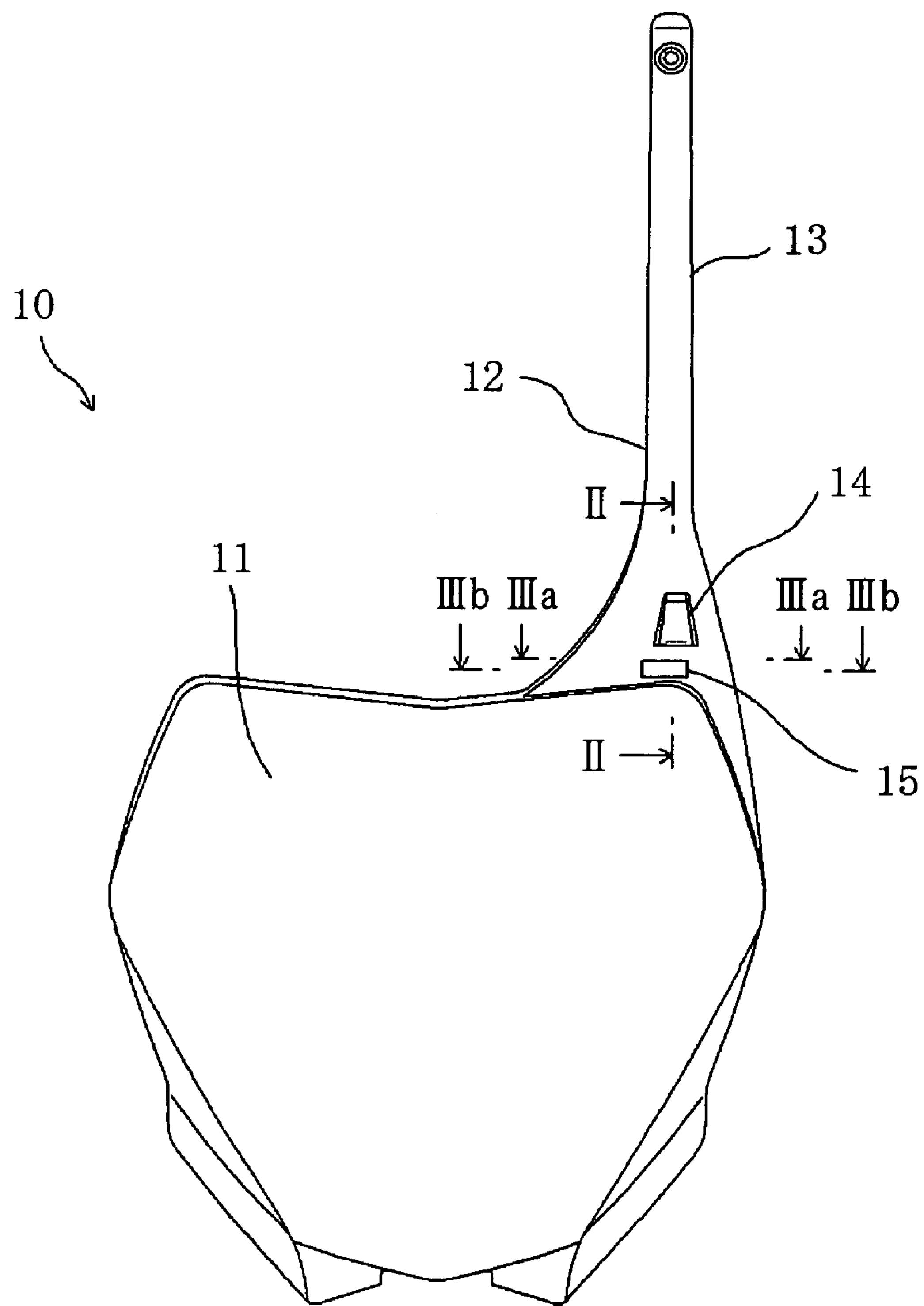
FIG. 3 is a front elevational view of a number plate arranged and configured in accordance with a preferred embodiment of the present invention.
Figure 4:
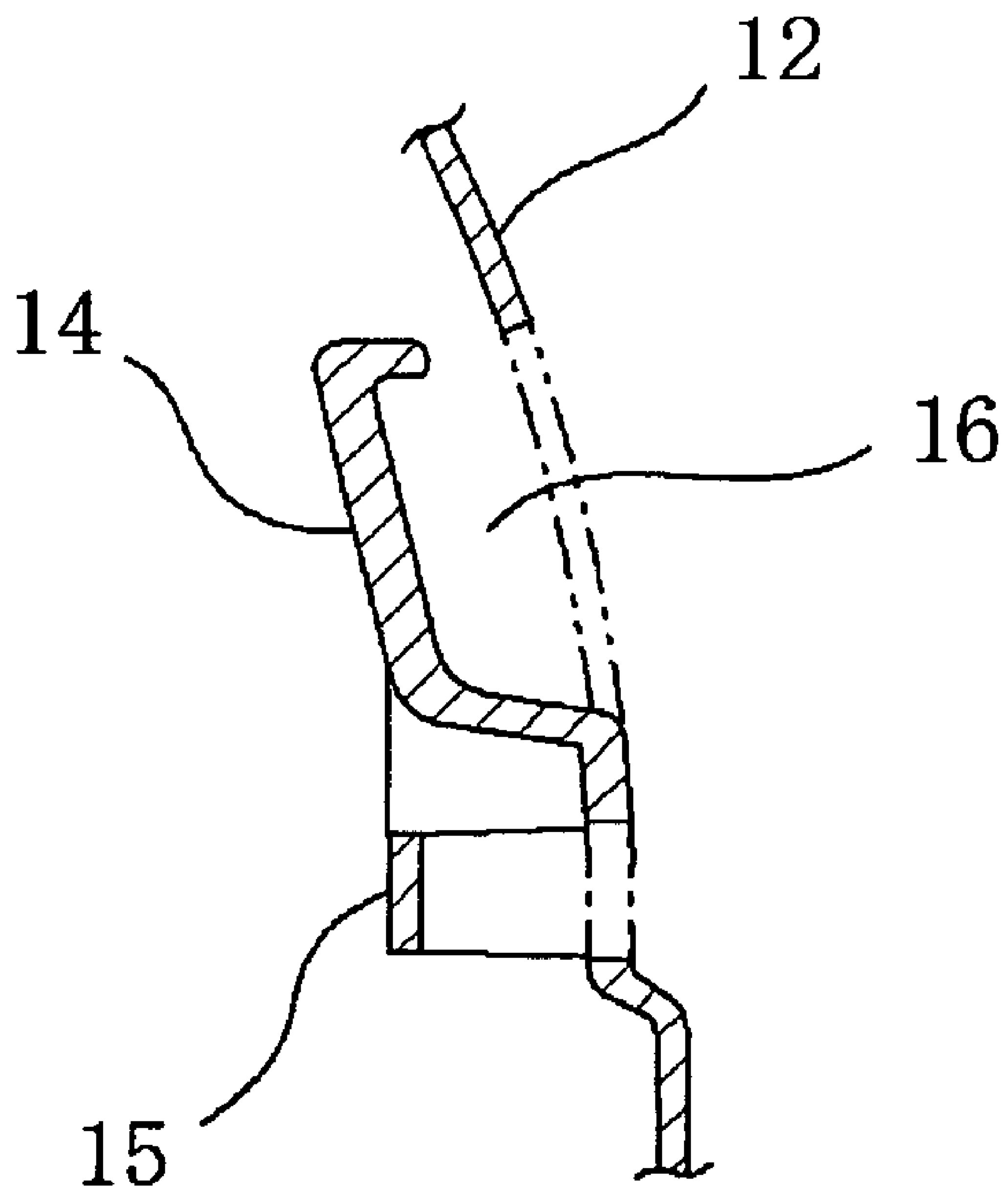
FIG. 4 is a vertical sectional view of the number plate of FIG. 3 taken along line II-II in FIG. 3.
Figure 5:
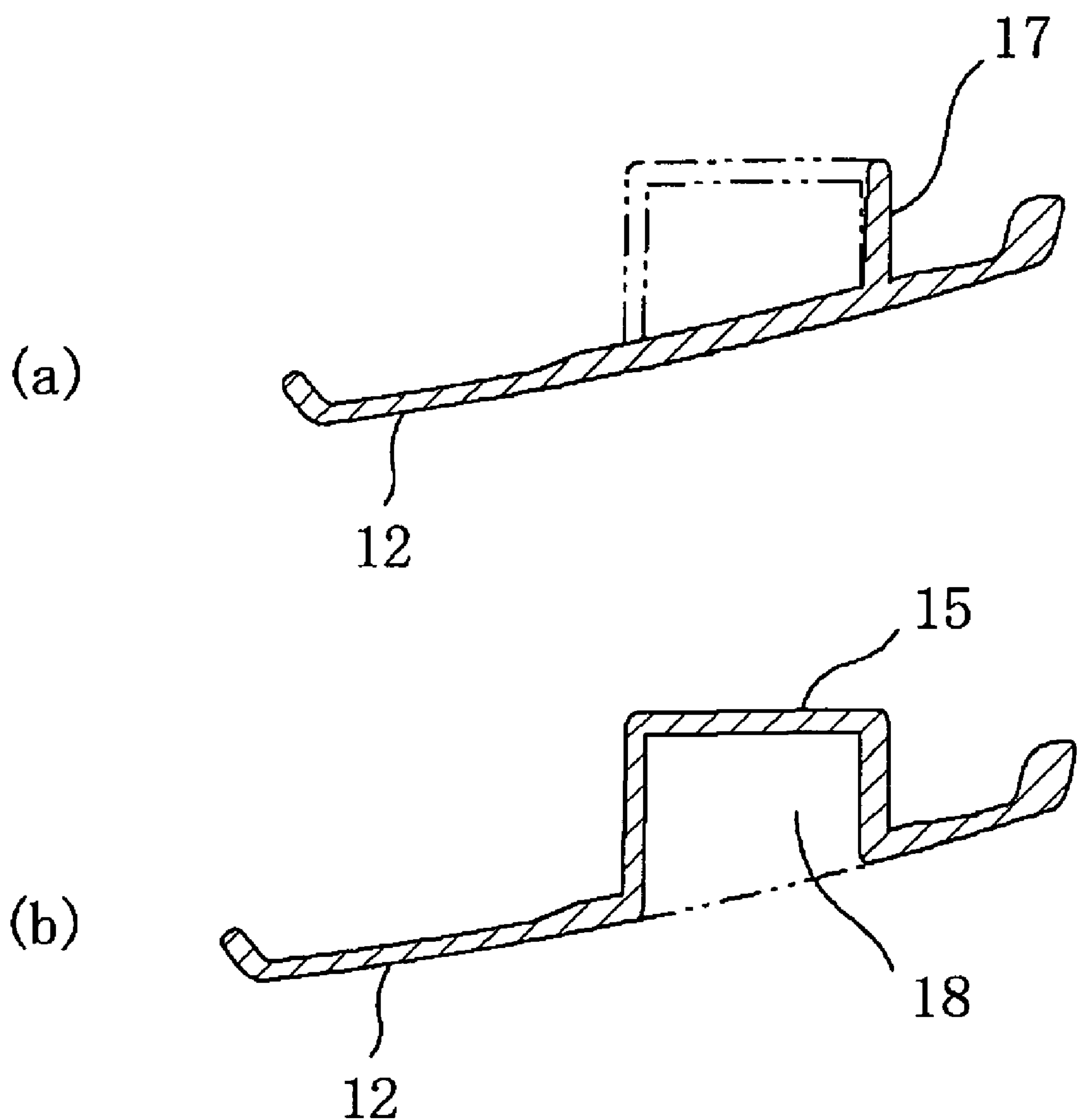
FIG. 5(*a*) is a cross-sectional view of the number plate of FIG. 3 taken along line IIa-IIa of FIG. 3.

With reference to FIGS. 3 through 5, the basic structure of a number plate 10 according to an embodiment of the present invention is herein described. FIG. 3 is a front elevational view of the number plate 10. FIG. 4 is a vertical sectional view, taken along the line II-II of FIG. 3. FIG. 5(*a*) and FIG. 5(*b*) are cross-sectional views, taken along the line IIa-IIa of FIG. 3 and along the line IIb-IIb of FIG. 3, respectively.

As shown in FIG. 3, the number plate 10 can include a number plate body 11 having a lower portion, a central portion, and an upper portion. At least a portion of the plate body 11 defines an indicating portion. In one configuration, the indicating portion is substantially defined by the central portion of the body 11. Preferably, the indicating portion can receive at least one Arabic numeral. More preferably, an Arabic numeral or other identifying character is positioned on the indicating portion.

The number plate 10 also preferably comprises an elongated band 12 extending upward from the upper portion of the number plate body 11. The elongated band 12 can comprise a wrapping portion 13. The wrapping portion 13 is sized and configured to allow it to be wrapped around a handlebar of the two-wheeled motor vehicle so that the wrapping portion 13 can be secured to or around the handlebar. In other words, a proximal end of the wrapping portion 13 is connected to the number plate body 11. Preferably, the wrapping portion would be disposed near a clutch quick adjuster, which is attached to the handlebar. In some configurations, the band portion 12 can be longer than is typically required so that a rider can adjust the position of the handlebar according to his/her preference and/or vary the shape of the handlebar to any other suitable shape while maintaining the ability to use the illustrated plate 10.

In one embodiment, an engagement portion 14 is formed on the band 12 near the base thereof to engage with a clutch cable, which extends from a clutch lever of the vehicle. In another embodiment, a retaining portion 15 is defined by the band 12 so as to receive at least a portion of a distal end of the band 12 when the band 12 is wrapped around the handlebar of the vehicle. At least one of the engagement portion 14 and the retaining portion 15 preferably are positioned on a widened portion of the elongated band 12. More preferably, the elongated band 12 has a first width and a second width that is larger than the first width with the first width being positioned distal of the second width and at least one, and preferably both, of the retaining portion 15 and the engagement portion 14 are positioned in a region of the band 12 having a width at least equal to the second width. In one configuration, the width of the band 12 expands from the wrapping portion 13 to a connection with the plate body 11 and at least one, and more preferably both, of the retaining portion 15 and the engagement portion 14 are positioned along the portion of the band coincides with the expanding width.

As shown in FIG. 4, the engagement portion 14 can be shaped to define a space 16 in which the clutch cable can be received. In one embodiment, the engagement portion 14 is formed integrally with the elongated band 12. The engagement portion 14 in the illustrated configuration comprises an offset finger with a tooth extending back toward the band 12. The tooth helps to retain the cable within the space 16 defined by the engagement portion. The illustrated finger has a first portion and a second portion that extend at an angle relative to each other. The first portion defines an offset between the second portion and the band 12 while the tooth extends into the offset. The offset preferably is less than or generally equal to the diameter of the clutch cable.

A retaining portion 15 can be formed below the engagement portion 14 so that the distal end of the elongated band 12 can be inserted through the retaining portion 15 and retained thereto so as to securely attach the number plate 12 to a straddle type vehicle, such as a two-wheeled motor vehicle. As shown in FIG. 5(*a*), in one embodiment of the present number plate, the retaining portion 15 is formed with a rib 17 at its upper part to increase the rigidity of the retaining portion 15. Preferably, the rib 17 extends between the retaining portion 15 and the engagement portion 14 to reinforce the engagement portion 14. As shown in FIG. 5(*b*), the retaining portion 15 defines a space 18 through which the distal end of the band portion 12 can be inserted so as to securely attach the number plate 12 to a straddle type vehicle. Preferably, the retaining portion 15 defines a generally U-shaped configuration. In some configurations, the retaining portion 15 comprises a pair of generally L-shaped members that have a space between them, which also defines a generally U-shaped configuration, albeit an open U-shaped configuration as opposed to a closed U-shaped configuration. In one particular embodiment, the retaining portion 15 can comprise cleats, buckles or other members to help retain the band 12 in position once inserted into the retaining portion 15.

In one embodiment, the number plate body 11 and the band portion 12 (as shown in FIG. 3) are made of a resin-based material (e.g., plastic resin material) and are formed together into a single body. In another embodiment, the number plate body 11 and the elongated band 12 are comprised of a plastic resin material and the elongated band 12 and the body of the number plate 11 are integrally connected. The thickness of at least a portion of the elongated band 12 can be less than the thickness of at least a portion of the number plate body 11. Such a configuration, where at least a portion of the body 11 has a greater thickness than at least a portion of the band 12, advantageously provides flexibility to the band portion 12 so that the band portion 12 can be wrapped around a handlebar in an improved manner.

In one embodiment of the present number plate, the number plate 10 comprises a front number plate 10 that can be attached to the front of a straddle type vehicle. The front number plate 10 can be attached to a two-wheeled motor vehicle with the band portion 12 wrapped around the handlebar of the vehicle. However, the front number plate 10 also may be provided with attaching parts (which are not shown in FIGS. 3-5) so that the number plate body 11 can be attached to any component or part of a two-wheeled motor vehicle other than the handlebar. As a result, the front number plate 10 need not be attached to the handlebar of the vehicle and a variety of different configurations and attachments are possible.

Figure 6:
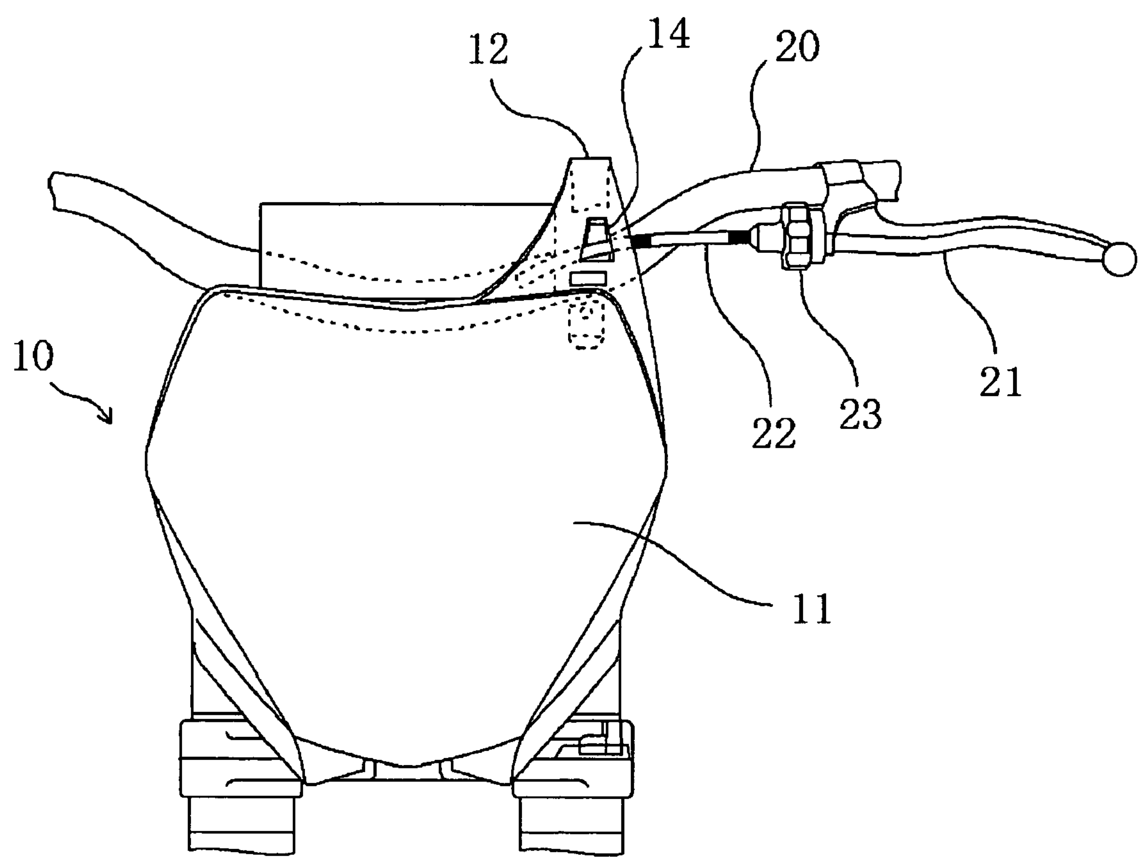
FIG. 6 is a front elevational view of a number plate arranged and configured in accordance with a preferred embodiment of the present invention after being attached to a straddle type vehicle.
Figure 7:
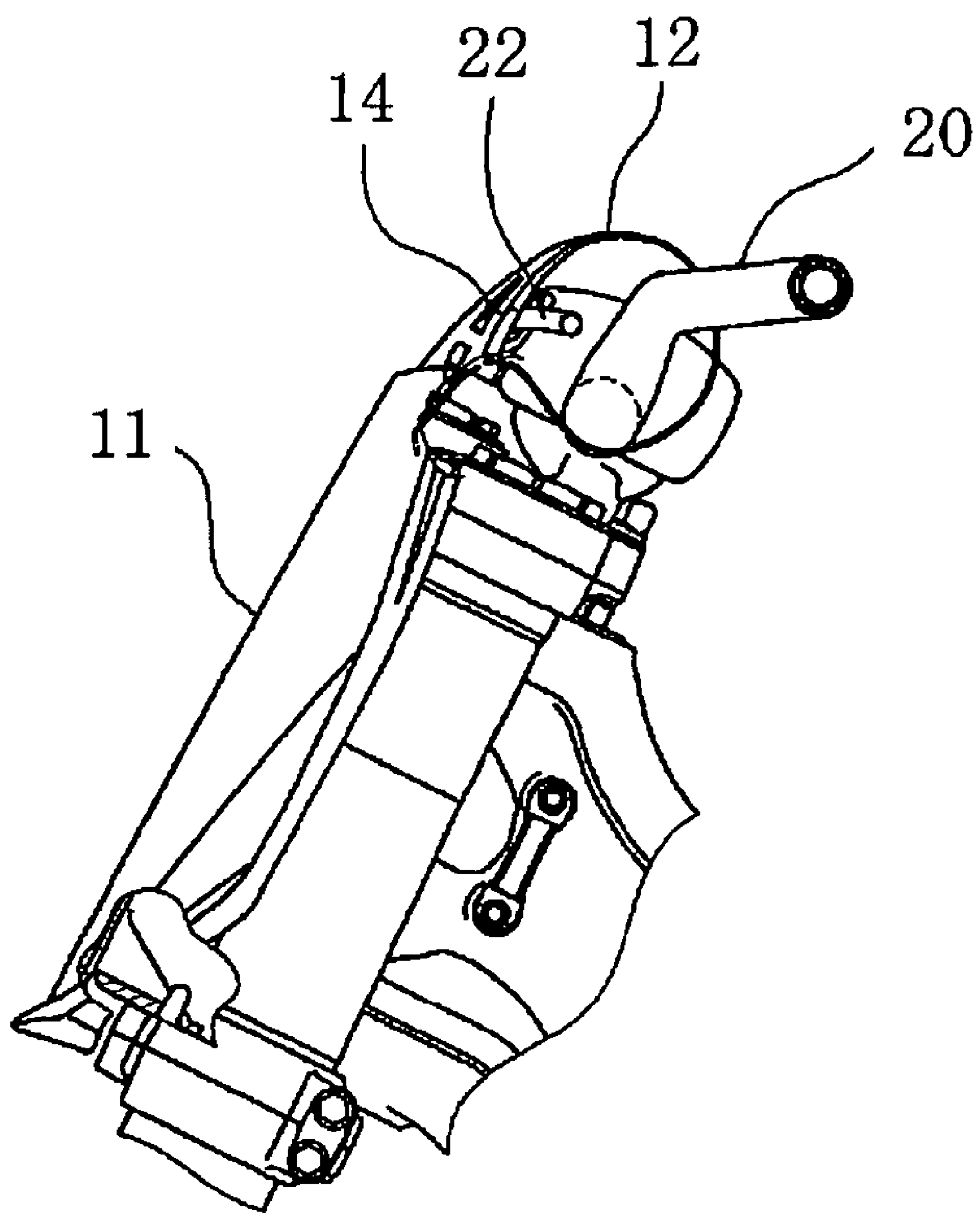
FIG. 7 is a side elevational view of the number plate of FIG. 6.

In FIGS. 6 and 7, the number plate 10 is attached to a handlebar 20 of a straddle type vehicle, such as a two-wheeled motor vehicle. FIG. 6 is a front elevational view of the number plate 10 and FIG. 7 is a side elevational view of the number plate 10. As shown in FIGS. 6 and 7, the number plate 10, which can comprise a front number plate, the elongated band 12 can be wrapped around the handlebar 20 in a location near a clutch mechanism 23 of the vehicle. The clutch cable 22 can extend from the clutch lever 21, which can be located at a left end of the handlebar 20. The clutch mechanism 23 can comprise a quick clutch adjuster in some embodiments. Preferably, the clutch cable 22 can be engaged in the engagement portion 14 formed near a base of the band 12.

In one embodiment, the band 12 is supported at least in part by the clutch cable 22. Preferably, the clutch cable 22 can be at least partially positioned in the engagement portion 14 of the band 12 of the number plate 10. More preferably, a segment of the length of the clutch cable 22 is entirely positioned within the engagement portion 14 of the band of the number plate 10. Even more preferably, the clutch cable extends through the space defined between the second portion of the engagement portion 14 and the opposing side of the band 12 such that the band 12 and the second portion of the engagement portion 14 squeeze or contact the clutch cable.

Advantageously, the clutch cable 22 is substantially rigid such that the clutch cable 22 maintains its structure under normal operating conditions and is not easily flexed. As a result, because the clutch cable 22 can be at least partially engaged in the engagement portion 14 of the band, the number plate 10 can be secured to the handlebar of the straddle type vehicle so as to minimize significant movement of the number plate 10 during operation of the vehicle. Advantageously, the clutch mechanism 23, such as a clutch quick adjuster, is less likely to be obstructed by the elongated band 12 of the number plate 10 and ease of operation results. Additionally, the body portion 11 of the number plate 10 can be properly displayed during operation of the vehicle.

In one embodiment of the straddle type vehicle in which the number plate 10 is being used in conjunction with, the handlebar 20 comprises a tapered handlebar. A tapered handlebar can have a right end, a central portion, and a left end. The right end and the left end of a tapered handlebar typically have a smaller cross-sectional diameter than the central portion such that the tapered handlebar is tapered from a central portion of the handlebar toward both the right end and the left end. In one embodiment, the elongated band 12 is offset to one side of the plate 10 such that the band 12 can be wrapped around a tapered portion of the tapered handlebar 20, such as the right end or the left end. This can cause the band 12 to readily twist to conform to the shape of the tapered handlebar. By engaging the clutch cable 22 and the band 12 through, for example, the engagement portion 14 of the band 12, the plate 10 can be more securely mounted to the vehicle.

It should be noted that the term "engaged" used in the foregoing description can mean, among other things, being supported in any form in which the clutch cable 22 is caught by the elongated band 12 to the extent that the attaching rigidity of the elongated band 12 can be maintained so that the effect of reducing twisting of the band portion 12 can be obtained.

In one embodiment, the number plate 10 is attached to a two-wheeled motor vehicle with the elongated band 12 being wrapped around the handlebar of the vehicle. However, as shown in FIGS. 8(*a*) and 8(*b*), the number plate body 11 also may be provided with attaching components so that the number plate 10 can be attached to any portion or component of a two-wheeled motor vehicle other than the handlebar.

Figure 8:
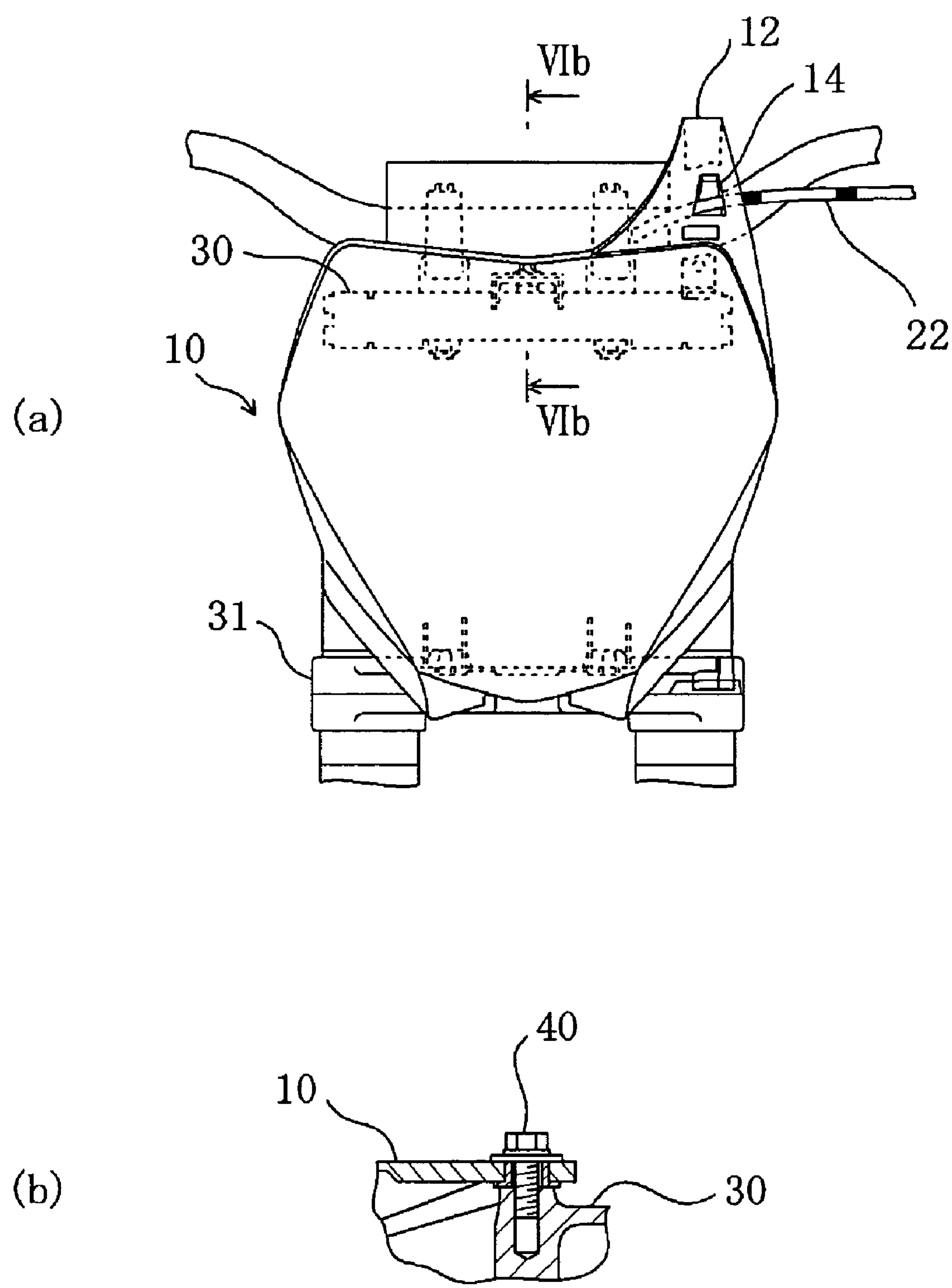
FIG. 8(*a*) is a front elevational view of a number plate arranged and configured in accordance with a preferred embodiment of the present invention, wherein the number plate is attached to an upper plate and a lower bracket of the straddle type vehicle.

FIG. 8(*a*) illustrates a configuration in which the front number plate 10 is attached to both an upper bracket 30 and a lower bracket 31 of the two-wheeled motor vehicle. FIG. 8(*b*) is an enlarged vertical sectional view of an attached part of the upper bracket 30, taken along the line VIb-VIb as shown in FIG. 8(*a*). As shown in FIG. 8(*a*), the lower bracket 31 has projections 32, which can be inserted into the number plate 10 so that the number plate 10 is at least partially attached to the lower bracket 31. As shown in FIG. 8(*b*), a portion of the number plate 10 can be at least partially fastened to the upper bracket 30 with a bolt 40.

While the number plate is described above by way of preferable embodiments, such descriptions are not to be considered limiting upon the scope of the invention. Therefore, various modifications may be made. For example, in FIG. 4, an example is illustrated in which the engagement portion 14 is formed integrally with the elongated band 12. However, in one embodiment of the number plate 10, the engagement portion 14 may be separately attached to the elongated band 12 so as to not be integrally formed with the band 12.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. For instance, while the illustrated configuration is shown in connection with a clutch cable, a brake cable or throttle cable also can be used to stabilize the plate 10. Moreover, the plate 10 can be stabilized by one or more than one cable. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. A number plate for a straddle type vehicle comprising:

a body comprising a lower portion, a central portion, and an upper portion;

an elongated band comprising a lower portion and an upper portion extending at least partially upward from the upper portion of the body, wherein the elongated band comprises a wrapping portion that when in combination with the straddle type vehicle at least partially wraps around a handlebar of the straddle type vehicle such that the wrapping portion of the band is held in place at least partially by the handlebar; and an engagement portion formed on the lower portion of the elongated band and when in combination with the straddle type vehicle engages with a clutch cable extending from a clutch lever of the straddle type vehicle such that the number plate is at least partially held in place by the clutch cable.

2. The number plate of claim 1, wherein the number plate is adapted to be disposed on a front portion of a straddle type vehicle.

3. The number plate of claim 1, wherein the central portion of the body comprises an indicating portion.

4. The number plate of claim 3, wherein the indicating portion comprises at least one Arabic numeral.

5. The number plate of claim 1, wherein the elongated band is disposed to one lateral side of the body such that the elongated band is adapted to be positioned near a clutch quick adjuster of the straddle type vehicle.

6. The number plate of claim 1 in combination with a motor vehicle that comprises a handlebar, wherein the handlebar is substantially rigid.

7. The number plate of claim 1 in combination with a motor vehicle that comprises a clutch cable, wherein the clutch cable is substantially rigid.

8. The number plate of claim 1, wherein the elongated band is integrally connected to the body of the number plate.

9. The number plate of claim 8, wherein the elongated band and the body are comprised of a plastic resin material.

10. The number plate of claim 1, wherein at least a portion of the body has a greater thickness than at least a portion of the elongated band.

11. The number plate of claim 1 further comprising an attaching portion disposed at least partially on the body of the number plate wherein the attaching portion can be attached to a portion of the straddle type vehicle so that the number plate is at least partially secured to a portion of the vehicle other than the handlebar.

12. The straddle type vehicle of claim 1, wherein the engagement portion comprises a finger extending rearwardly from the band and a tooth extending from the finger toward the band, the engagement portion defining a space for receiving the clutch cable such that the tooth is configured to securely retain the clutch cable within the space.

13. The straddle type vehicle of claim 12, wherein the finger comprises a first portion coupled to the band and extending away from the band and a second portion extending from the first portion at an angle relative to the first portion, wherein the tooth extends from an end of the second portion of the finger toward the band to define a gap between an end of the tooth and the band.

14. A straddle type vehicle comprising a frame, the frame being supported by a wheel, the wheel rotating about a generally horizontal axis, an engine supported by the frame, a steering shaft comprising at least a portion of the frame, a handlebar coupled to the steering shaft, the handlebar adapted to rotate the steering shaft so as to steer the vehicle, a clutch assembly at least partially coupled to the handlebar comprising a clutch lever and a clutch cable extending from the clutch lever, a number plate comprising a body portion and an elongated band that extends from the body portion wherein the elongated band comprises a wrapping portion adapted to at least partially wrap around the handlebar, an engagement portion formed on a lower portion of the elongated band that engages with the clutch cable such that the number plate is at least partially held in place by the clutch cable.

15. The straddle type vehicle of claim 14, wherein the handlebar comprises a tapered handlebar.

16. The straddle type vehicle of claim 15, wherein the elongated band is at least partially wrapped around a first tapered end of the tapered handlebar.

17. The straddle type vehicle of claim 14, wherein the number plate is at least partially attached to the handlebar substantially near the clutch assembly of the vehicle.

18. The straddle type vehicle of claim 14, wherein the straddle type vehicle comprises an off-road two-wheeled motor vehicle.

19. A front number plate for an off-road two-wheeled motor vehicle, the number plate, when in combination with the vehicle, comprising a body portion having an indicating portion adapted to display at least one number, a band portion extending from an upper part of the body portion of the number plate wherein the band portion comprises a base portion and an elongated band, the base portion connected to the upper part of the body portion and defining an engagement portion and a retaining portion, the engagement portion receiving at least a portion of a control cable on a handlebar of the vehicle and maintaining such at least a portion of a control cable substantially attached to the front number plate, the elongated band at least partially wrapping around at least a portion of the handlebar such that the retaining portion of the base portion of the band receives at least a portion of the elongated band and maintains such at least a portion of the elongated band substantially attached to the base portion of the band so as to securely maintain the front number plate on the handlebar during operation of the vehicle.

20. The straddle type vehicle of claim 19, wherein the retaining portion is disposed below the engagement portion.

* * * * *

UNITED STATES PATENT AND TRADEMARK OFFICE

CERTIFICATE OF CORRECTION

PATENT NO. : 7,637,339 B2
APPLICATION NO. : 11/391714
DATED : December 29, 2009
INVENTOR(S) : Takayuki Suzuki It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 493 days.

Signed and Sealed this

Ninth Day of November, 2010

David J. Kappos

*Director of the United States Patent and Trademark Office*